United States Patent Office 2,848,426
Patented Aug. 19, 1958

2,848,426

POLYEPOXY POLYETHERS, THEIR PREPARATION AND POLYMERS

Herbert A. Newey, Lafayette, Calif., assignor to Shell Development Company, New York, N. Y., a corporation of Delaware No Drawing. Application December 3, 1956
Serial No. 625,626

15 Claims. (Cl. 260—2)

This invention relates to a new class of polyepoxides and to a method for their preparation. More particularly, the invention relates to new polyepoxides derived from monohydric alcohols possessing an epoxy-substituted cycloaliphatic ring, to a method for their preparation and to the utilization of the new polyepoxides, particularly in the preparation of valuable resinous products.

Specifically, the invention provides new and particularly useful polyepoxides comprising ethers of monhydric alcohols possessing an vic-epoxy group contained in a cycloaliphatic ring and polyhydroxy-containing compounds, such as, for example, di(3,4-epoxycyclohexylmethyl) ether of 1,4-butanediol. These new polyepoxides are preferably obtained by preparing an ether of a monohydric alcohol possessing an ethylenic group in a cycloaliphatic ring and a polyhydroxy-containing compound, and then treating this ether with an epoxidizing agent to convert the ethyllenic groups to epoxy groups.

The invention further provides new polymeric materials obtained by reacting the above-described polyepoxides with compounds, such as amines, polybasic acid anhydrides, BF₃ and its complexes and metal salt catalysts.

It is an object of the invention to provide a new class of polyepoxides and a method for their preparation. It is a further object to provide new polyepoxides possessing a plurality of vic-epoxy groups in cycloaliphatic rings. It is a further object to provide a new class of polyepoxides which are difficult to cure with amines. It is a further object to provide a new class of polyepoxides which while they are difficult to cure with amines react readily with other epoxy curing agents such as anhydrides. It is a further object to provide new polyepoxides which can be cured with anhydrides and BF₃ complexes to form very hard solvent resistance products. Other objects and advantages of the invention will be apparent from the following detailed description thereof.

It has now been discovered that these and other objects may be accomplished by the new polyepoxides of the present invention which comprises ethers of monohydric alcohols possessing a vic-epoxy group contained in a cycloaliphatic ring and polyhydroxy-containing compounds. These new polyepoxides have been found to possess many new and unexpected properties due to their unique structural features. It has been found, for example, that due in part to the feature of having an internal epoxy group in a ring structure and the plurality of ether linkages, the new compounds are surprisingly difficult to cure with amines and particularly with monoamines or cycloaliphatic or aromatic polyamines and they react with such amines to form linear polymers. Such polymers may be subsequently cured through the hydroxyl groups formed during the reaction. This feature of low activity with amines also makes the compounds of value as linking agents in joining polymers having amine groups so as to increase their molecular weight.

While the new polyepoxides are difficult to cure with amines, they do display unexpectedly high degree of activity with other epoxy curing agents, such as anhydrides accelerated with amines and BF₃ complexes, to form products which are in many cases harder and more resistant to solvents than straight chain ethers, such as glycidyl ethers.

The novel polyepoxides of the present invention comprise the ethers of monohydric alcohols possessing a vic-epoxy group in a cycloaliphatic ring and polyhydroxy-containing compounds. The expression "Vic-epoxy group" as used herein and in the claims refers to the group

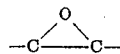

wherein the oxygen is attached to vicinal carbon atoms. The hydroxyl group of the vic-epoxy-substituted alcohol may be attached directly to the ring or in a sidechain attached to the ring. Examples of the vic-epoxy-substituted monohydric alcohols include, among others, (3,4-epoxycyclohexyl)methanol, (3,4 - epoxycyclohexyl) - 3-propanol, 3,4-epoxycyclohexanol, (2,3-epoxycyclohexyl)-4-butanol, (2,3-epoxycyclohexyl)-3-propanol, (2-chloro-4,5-epoxycyclohexyl)methanol, (3-methyl-4,5-epoxycyclohexyl)methanol, 2,3-epoxycyclopentanol, 2,5-diisopropyl-3,4-epoxycyclohexanol and 3,4-epoxycyclopentanol. Preferred are the epoxycycloalkanols and epoxycycloalkyl-alkanols containing up to 12 carbon atoms and having the epoxy group at least one atom removed from the C—OH group.

The polyhydric alcohols, ethers of which are provided by the present invention, include those alcohols containing a plurality, e. g. two, three, four or more, etherifiable hydroxyl groups. The alcohols may be monomeric or polymeric, acyclic, alicyclic or heterocyclic and may be further substituted with non-interfering substituents, such as halogen atoms, alkoxy radicals, ester radicals and the like. Examples of the polyhydric alcohols are ethylene glycol, propylene glycol, glycerol, pentaerythritol, polypentaerythritol, polyglycerol, mannitol, sorbitol, dulcitol, inositol, carbohydrates, methyl trimethylolpropane, butanediol, 1,2,6-hexanetriol, 2,8-dodecanediol, glycerol monoethyl ether, glycerol allyl ether, diethylene glycol, triethylene glycol, 2-ethyl-hexanetriol-1,2,6-tetrahydroxycyclohexane, 3,3'-thiodipropanol, 4,4'-thiodibutanol, poly(allyl alcohol), poly(vinyl alcohol), poly(methallyl alcohol), polyols formed by condensation of bis-phenols and epichlorohydrin, and the like, and mixtures thereof.

Preferred polyhydric alcohols are the aliphatic saturated polyhydric alcohols containing from 2 to 6 hydroxyl groups and from 2 to 16 carbon atoms, such as, for example, ethylene glycol, diethylene glycol, glycerol, pentaerythritol, mannitol, polyglycerol, low molecular weight poly(allyl alcohol), poly(vinyl alcohol), and the like. Especially preferred alcohols are alkane polyols containing from 2 to 4 hydroxyl groups and from 3 to 12 carbon atoms.

Polyhydric phenols, ethers of which are provided by the present invention, include, among others, resorcinol, catechol, hydroquinone, chlororescorcinol, bis(4-hydroxyphenol)propane, 4,4'-dihydroxybenzophenone, bis(4-hydroxyphenyl)butane, 2,2 - bis(4 - hydroxy - 2 - tertiary butylphenyl)butane, 1,5-dihydroxynaphthalene, 1,1,2,2-tetrakis(4 - hydroxyphenyl)ethane, 1,1,3,3 - tetrakis(4-hydroxyphenyl)propane and the like. Preferred polyhydric phenols include the mononuclears and dinuclear polyhydric phenols containing from 6 to 18 carbon atoms, and particularly the aryl dihydric phenols and the bis(hydroxyphenyl)alkanes.

Examples of the new polyepoxides include, among others, di(2,3-epoxycyclohexyl) ether of ethylene glycol, di- (3,4-epoxycyclohexyl) ether of 1,5-pentanediol, tri[(2,3-epoxycyclohexyl)methyl] ether of glycerol, di[(3,4-epoxycyclohexyl)ethyl] ether of diethylene glycol, di[(2,3-epoxycyclohexyl)methyl] ether of cyclohexanediol, tri(2,3-epoxycyclopentyl) ether of 1,2,6-hexanetriol, tri[(2,3-epoxycyclohexyl)methyl] ether of 1,3,5-pentanetriol, (2,3-epoxycyclohexyl)methyl ether of polyallyl alcohol, di(2,3-epoxy-4-chloro-cyclohexyl) ether of triethylene glycol, tri(2,3-epoxy-4-dodecylcyclohexyl) ether of glycerol, di[(2,3-epoxycyclohexyl)methyl] ether of 2,3,-5,6-tetramethyl-1,2-hydroxybenzene, di(2,3-epoxycyclohexyl) ether of bis-phenol, di(2,3-epoxycyclohexylmethyl) ether of resorcinol and the di(2,3-epoxycyclohexylmethyl) ether of 2,2'-bis(4-hydroxycyclohexyl) propane.

The new polyepoxides of the present invention may be prepared by a variety of methods. They may be obtained, for example, by preparing the corresponding ether of a monohydric alcohol having an ethylenic group in the cycloaliphatic ring and the desired polyhydroxy-containing material, and then treating this unsaturated ether with an epoxidizing agent to convert the ethylenic groups to vic-epoxy groups. Di(3,4-epoxycyclohexylmethyl) ether of 1,4-butanediol may be prepared for example, by treating di(3-cyclohexenylmethyl) ether of 1,4-butanediol with an epoxidizing agent.

The preparation of the corresponding ethers of the unsaturated monohydric alcohol and the polyhydroxy-containing compound may be accomplished by conventional methods, such as reacting a corresponding halide of the unsaturated monohydric alcohol or the polyhydric compound with the other hydroxy-containing material in the presence of caustic. Thus, di(cyclohexenylmethyl) ether of 1,4-butanediol may be prepared by reacting cyclohexenylmethanol with 1,4-dichlorobutane in the presence of NaOH. This type of etherification reaction is preferably conducted at temperatures ranging from 50° C. to 100° C. Solvents are not generally used if excess of the proper reagent is used but may be employed if desired or necessary. The unsaturated ethers may be recovered by any suitable method, such as distillation, crystallization fractional, precipitation and the like.

The epoxidation of the unsaturated ethers may be advantageously carried out by reacting the ethers with an epoxidizing agent. Organic peracids, such as peracetic acid, perbenzoic acid, monoperphthalic acid and the like, are preferred agents for this reaction.

The amount of the epoxidizing agent employed will vary over a considerable range depending upon the type of product desired. In general, one should employ at least one mole of the epoxidizing agent for every ethylenic group to be epoxidized. Thus, to produce di[(3,4-epoxycyclohexyl)methyl] ether of 1,4-butanediol from di(cyclohexenylmethyl) ether of 1,4-butanediol, one should react one mole of the unsaturated ether with approximately two moles of the epoxidizing agent. In some cases, it is rather difficult to effect epoxidation of all of the ethylenic groups and if a completely epoxidized product is required, additional epoxidizing agent and/or longer reaction periods may be required.

It is preferred to carry out the epoxidation reaction in a suitable mutual solvent for the reactants and product. Chloroform is an especially useful solvent for the purpose, but other materials, such as ethyl ether, dichloromethane, benzene, ethyl acetate, etc., and the like may be used. It is not necessary to operate under anyhdrous conditions, but the amount of water present should be limited so as to avoid excessive hydrolysis of the epoxy group or groups. Up to 25% water in the reaction mixture may be tolerated.

The temperature employed during the epoxidation may vary over a considerable range depending upon the type of reactants and oxidizing agent selected. It is generally desirable to maintain the temperature between 10° C. to 60° C. and more preferably between 10° C. and 40° C.

Atmospheric, superatmospheric or subatmospheric pressures may be employed as desired.

The epoxidized products obtained by this method may be recovered from the reaction mixture by any convenient means known to the art, such as distillation, extraction, fractional precipitation, filtration, and the like.

The polyepoxides of the present invention are water-white to slightly yellow colored liquids to crystalline solids. They have a plurality of vic-epoxy groups per molecule and, as noted above, the liquid ethers have low viscosities and are generally soluble in most solvents, such as ketones, alcohols and liquid hydrocarbons, and are compatible with many synthetic oils and resins.

For certain applications, such as in the preparation of polymeric products, it is sometimes desirable to have high molecular weight products. Such products may be obtained by reacting the above-described new polyepoxides with polyhydric compounds. In this case, the polyhydric compound reacts with the epoxy groups to form

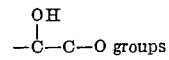

High molecular weight products may be obtained from di(3,4-epoxycyclohexylmethyl) ether of 1,4-butanediol, for example, by reacting X moles of that compound with one mole of a polyhydric phenol having XOH groups. Polyhydric compounds used for this purpose may be any polyhydric phenol, such as resorcinol, 2,2-bis(4-hydroxyphenyl) propane, catechol, hydroquinone, methyl resorcinol, 2,2-bis(4-hydroxyphenyl) butane and the like.

The condensation reaction described above for the preparation of the higher molecular weight products may be accomplished by merely heating the components together in the presence or absence of inert diluents. The condensation reaction is preferably accomplished at temperatures ranging from about 25° C. to 200° C. and more preferably from 150° C. to about 200° C.

If the resulting high molecular weight products possess less than the desired number of epoxy groups, such as may be the case when the polyhydric phenol is reacted with less than a double molar quantity of the new polyepoxides, additional epoxy groups may be introduced by reacting the higher molecular weight products with epoxy-forming materials e. g., the epoxy-halo-alkanes, such that there will be one epoxy group for each of the OH groups of the polyhydric phenol to be reacted. Thus, if the higher molecular weight product was obtained by reacting one mole of di(3,4-epoxycyclohexylmethyl) ether of 1,4-butanediol with two moles of the dihydric phenol, the resulting higher molecular weight product would then be reacted with approximately two moles of the epoxy-forming material. The halohydrin obtained may then be dehydrohalogenated according to conventional procedure.

The higher molecular weight products produced by the above methods vary from viscous liquids to solids having relatively high melting points. They possess active epoxy groups as well as hydroxyl groups and may be cured or undergo further reaction through either of these functional groups.

The new polyepoxides of the invention and their higher molecular weight products as described above may be cured through the epoxy groups to form valuable polymeric products. They may be polymerized alone or with other polyepoxide materials in a variety of different proportions, such as, for example, with amounts of other polyepoxides varying from 1% to 95% by weight. Polyepoxides that may be copolymerized with these products of the present invention include, among others, glycidyl polyethers of polyhydric phenols obtained by reacting polyhydric phenols, such as bis-phenol-A, resorcinol, and the like, with an excess of chlorohydrin, such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxides polyethers obtained by reacting a polyhydric alcohol or polyhydric phenol with any of the above-described polyepoxides. The glycidyl polyethers of polyhydric phenols obtained by condensing the polyhydric phenols with epichlorohydrin are often referred to as "ethoxyline" resins. See Chemical Week, vol. 69, page 27, for September 8, 1951.

A more detailed description of polyepoxides and their preparation may be found in U. S. 2,633,458.

A great variety of different curing agents may be employed in effecting the above-described homo- and co-polymerization. Such agents include, among others, carboxylic acids or anhydrides, such as oxalic acid, phthalic acid, phthalic anhydride; Friedel-Crafts metal halides, such as aluminum chloride, zinc chloride, ferric chloride or boron trifluoride as well as complexes thereof with ethers, amines, acid anhydrides, ketones, diazonium salts, etc.; phosphoric acid and partial esters thereof including n-butyl orthophosphate, hexaethyl tetraphosphate; aliphatic polyamines such as triethylene tetraamine and tetraethylene pentamine and particularly polyamines having at least three nitrogen atoms; and salts of inorganic acids, such as zinc fluoborate, potassium persulfate, nickel fluoborate and magnesium perchlorate.

The amount of the curing agents employed may vary over a considerable range depending upon the agent selected. With curing agents having replaceable hydrogen, such as the amine curing agents, amounts of agent employed vary up to and including equivalent proportions, i. e., sufficient curing agent to furnish a replaceable hydrogen atom for every epoxy group to be reacted. In most cases, satisfactory cures are obtained with from .7 to 1 equivalent of the curing agent per equivalent of epoxy compound.

Other curing agents, such as metal salts, are employed in amounts varying from about 1% to about 20%, and more preferably from about 3% to 20%.

The cure of the polyepoxides is preferably effected by mixing the curing agent with the polyepoxide and then heating. The temperature selected will vary with the curing agent. Active curing agents, such as the aliphatic amines may be utilized, for example, at lower temperatures, such as from room temperature to about 60° C. Less active materials, such as polybasic anhydrides and acids, generally require higher temperatures, such as temperatures ranging from about 60° C. to 150° C.

If the new polyepoxides or their higher molecular weight derivatives are to be used in the preparation of castings or pottings, the curing agent and the epoxy material are generally combined together and then poured into the mold or casting which may if desired contain additional material, such as electrical wires, apparatus, etc., and the mixture then heated to effect the cure.

The new polyepoxides and their higher molecular weight derivatives may also be employed with the aforedescribed curing agents to prepare improved surface coating compositions of the air-drying or baking type. In utilizing the products for this application, it is generally desirable to combine the epoxy material and the curing agent with the desired solvents, and, if desired, other film-forming materials and driers, and then apply the resulting mixture to the surface to be coated. Film-forming materials that can be used with the epoxy material in this manner include the drying oils, such as tung oil, linseed oil, dehydrated castor oil, soybean oil, and the like; cellulose derivatives such as cellulose nitrate, cellulose acetate, cellulose acetate butyrate, cellulose propionate, ethyl cellulose, and the mixtures thereof; and vinyl polymers, such as polymers of vinyl chloride, vinylidene chloride, methyl methacrylate, diallyl phthalate, and the like. The coatings prepared in this manner may be allowed to set to a hard finish at room temperature or heat may be applied to hasten the cure.

The higher molecular weight hydroxy-containing derivatives of the new polyepoxides as described above are particularly suited for use in preparing coating compositions as described above, as they may be reacted through the hydroxyl group or groups with drying oil fatty acids or may be cured through the hydroxyl groups with compounds, such as methylol ureas, methylol phenols, diisocyanates, and the like.

The new polyepoxides and their higher molecular weight derivatives may also be employed with the curing agents to prepare valuable adhesive and impregnating compositions. The monomeric polyepoxides generally have sufficiently low viscosities so they may be used in these applications as such without the addition of diluents. The higher molecular weight products, on the other hand, are preferably utilized with diluents and solvents, such as benzene, toluene, acetonitrile, and the like. In these applications a spreadable fluid mixture containing the polyepoxide is formed and then the curing agent added and the mixture applied to the desired surface.

As noted above, reaction of the new polyepoxide with monoamines or secondary cycloaliphatic or aromatic amines will give linear high molecular weight products instead of cross-linked cured products. If less than the equivalent amount of these amines are used, the polymer will contain unreacted epoxy groups and these may be reacted with the above-described curing agents to form hard products. Such curable high molecular weight products are particularly suited for use in making coating compositions.

The new polyepoxides and their higher molecular weight derivatives may also be used as stabilizing agents for various halogen-containing polymers, and particularly the vinyl halide polymers. These products are compatible with the polymers and in combination therewith give good resistance to discoloration by heat and light. These products may be used as stabilizers, alone or in combination with other stabilizing agents, such as urea and thiourea derivatives. In most cases, the products are effective as stabilizers in amounts varying from about .1% to 5% by weight of the polymer being stabilized. The epoxy material may be combined with the halogen-containing polymer by any suitable method, such as by dissolving the products in a suitable solvent or by milling the products together on a suitable roll mill.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

*Example 1*

This example illustrates the preparation and some of the properties of di(3,4-epoxycyclohexylmethyl) ether of 1,4-bis(hydroxymethyl) tetramethylbenzene.

230 parts of 1,4-bis(chloromethyl) tetramethylbenzene, 80 parts of NaOH and 230 parts of 3-cyclohexenylmethanol were placed in a reaction flask and heated to 150° C. Acetic acid was then added and the solution boiled. The mixture was then poured into water and a white precipitate formed. This was identified as di(3 - cyclohexenylmethyl) ether of 1,4 - bis(hydroxymethyl) tetramethylbenzene.

193 parts of the di(3-cyclohexenylmethyl) ether produced above was added to 180 parts of chloroform. 163 parts of a 45% peracetic solution was then added to the mixture and the resulting mixture maintained at 30° C. for 2 hours and then allowed to stand in a water bath at 27° C. for 12 hours. The reaction mixture was then extracted with water, sodium carbonate, water and then filtered and dried. Chloroform was then taken off and the product distilled to yield a substantially white solid identified as di(3,4-epoxycyclohexylmethyl)

ether of 1,4-bis(hydroxymethyl) tetramethylbenzene. Epoxy value was 0.393 eq./100 g.

The di(3,4-epoxycyclohexylmethyl) ether of 1,4-bis-(hydroxymethyl) tetramethylbenzene produced above was heated with an equivalent amount of hexahydrophthalic anhydride and 0.1 part of benzyldimethylamine at 100° C. for 2 hours and then at 120° C. for two more hours. The resulting product was a hard solvent resistant casting.

The ether produced above was also heated with 5 parts (per 100 parts of ether) of BF$_3$-ethyl ether complex at 150° C. for several hours. The resulting product was a hard solvent resistant casting.

The difference in activity of the above ether with amines as compared to glycidyl ethers is shown by the following. 100 parts of di(3,4-epoxycyclohexylmethyl) ether of 1,4-di(hydroxymethyl) tetramethylbenzene was heated with 25 parts of meta-phenylene diamine at 150° C. for 2 hours. The resulting product was a soft solid which was soluble in boiling acetone. On the other hand, when 100 parts of diglycidyl ether of 1,4-di(hydroxymethyl)tetramethylbenzene (epoxy value 0.457 eq./100 g.) was heated with 25 parts of meta-phenylene diamine at 150° C., the resulting product was a very hard casting having good resistance to solvents.

Products having related properties are obtained by replacing the bis(chloromethyl) tetramethylbenzene in the above preparation process with equivalent amounts of each of the following: 1,4-bis(chloromethyl) 2,3-diisopropylbenzene and 1,3-bis(chloromethyl) benzene.

*Example II*

This example illustrates the preparation and some of the properties of di(3,4-epoxycyclohexylmethyl) ether of 1,4-butanediol.

91 parts of 1,4-dichlorobutane, 80 parts of NaOH and 230 parts of 3-cyclohexenylmethanol are placed in a reaction flask and heated to 150° C. Acetic acid is then added and the solution boiled. The mixture is then distilled to yield a liquid identified as the di(3-cyclohexenylmethyl) ether of 1,4-butanediol.

139 parts of the di(3-cyclohexenylmethyl) ether produced above is added to 180 parts of chloroform. 163 parts of a 45% peracetic acid solution is then added to the mixture and the resulting mixture maintained at 30° C. for 2 hours and then allowed to stand in a water bath at 27° C. for 12 hours. The reaction mixture is then extracted with water, sodium carbonate, water and then filtered and dried. Chloroform is then taken off and the product distilled to yield a viscous liquid identified as di(3,4-epoxycyclohexylmethyl) ether of 1,4-butanediol.

100 parts of the di(3,4-epoxycyclohexylmethyl) ether of 1,4-butanediol produced above is mixed with an equivalent amount of hexahydrophthalic anhydride and 0.1 parts of benzyl-dimethylamine at 150° C. for 2 hours. The resulting product is very hard and has excellent resistance to solvents and water.

The above-noted diether forms a soft solid when heated with diethylene triamine.

Related products are obtained by replacing the 1,4-dichlorobutane with equivalent amounts of each of the following: 1,8-dichlorooctane, 1,6-dichlorohexane $$ClCH_2CH_2OCH_2CH_2Cl$$

and 1,2-dichloroethane.

*Example III*

This example illustrates the preparation and some of the properties of di(3,4-epoxycyclohexylmethyl) ether of bis-phenol A [2,2-bis(4-hydroxyphenyl)]propane.

228 parts of bis-phenol-A, 80 parts of NaOH and 265 parts of 3-cyclohexenylmethyl chloride are placed in a reaction flask and heated to 150° C. Acetic acid is then added and the solution boiled. The mixture is then distilled to yield a crystalline solid identified as di(3-cyclohexenylmethyl) ether of bis-phenol-A.

208 parts of the di(3-cyclohexenylmethyl) ether of bis-phenol-A produced above is added to 300 parts of chloroform. 165 parts of a 45% peracetic acid solution is then added to the mixture and the resulting mixture maintained at 30° C. for 2 hours and then allowed to stand in a water bath at 27° C. for 12 hours. The reaction mixture is then extracted with water sodium carbonate, water and then filtered and dried. Chloroform is then taken off to yield the desired di(3,4-epoxycyclohexylmethyl) ether of bis-phenol-A.

The di(3,4-epoxycyclohexylmethyl) ether produced above is heated with an equivalent amount of hexahydrophthalic anhydride and 0.1 part of benzyldimethylamine at 100° C. and then at 120° C. The resulting product is a hard solvent resistant casting.

The ether produced above is also heated with 5 parts (per 100 parts of ether) of BF$_3$ ethyl ether complex at 150° C. for several hours. The resulting product is a hard solvent resistant casting.

Related results are obtained by replacing bis-phenol-A in the above process with equivalent amounts of each of the following: resorcinol, bis(4-hydroxyphenyl)sulfone and 2,2-bis(4-hydroxyphenyl) butane.

*Example IV*

This example illustrates the preparation and some of the properties of di(3,4-epoxycyclohexyl) ether of 1,5-pentanediol.

140 parts of 1,5-dichloropentane, 80 parts of NaOH and 196 parts of 3-cyclohexenol are placed in a reaction flask and heated to 150° C. Acetic acid was then added and the solution boiled. The mixture is then distilled to recover di(3-cyclohexenyl) ether of 1,5-pentanediol.

132 parts of the di(3-cyclohexenyl) ether of 1,5-pentanediol produced above is added to 200 parts of chloroform. 165 parts of a 45% peracetic acid solution is then added to the mixture and the resulting mixture maintained at 30° C. for 2 hours and then allowed to stand in a water bath at 30° C. for 12 hours. The reaction mixture is extracted with water, sodium carbonate, water and then filtered and dried. Chloroform is taken off and the product distilled to yield a viscous liquid identified as di(3,4-epoxycyclohexyl) ether of 1,5-pentanediol.

The di(3,4-epoxycyclohexyl) ether of 1,5-pentanediol produced above is heated with an equivalent amount of a mixture of pyromellitic anhydride and hexahydrophthalic anhydride (1/1 mixture by weight) and 0.1 part of benxyldimethylamine at 120° C. for several hours. The resulting product is a hard solvent resistant casting. The product obtained by heating with diethylene triamine, however, is only a soft solid.

Polyepoxides having related properties are obtained by replacing the 3-cyclohexenol in the above-described process with equivalent amounts of each of the following: 3-cyclopentenol, 2,5 - diisopropyl - 3 - cyclohexanol and 2-octyl-3-cyclopentenol.

*Example V*

This example illustrates the preparation and some of the properties of tris(3,4-epoxycyclohexyl) ether of 1,3,6-hexanetriol.

188 parts of 1,3,6-trichlorohexane, 120 parts of NaOH and 294 parts of 3-cyclohexenol are placed in a reaction flask and heated to 150° C. Acetic acid is then added and the solution boiled. The mixture is then distilled to recover tris(3-cyclohexenyl) ether of 1,3,6-hexanetriol.

187 parts of the tris(3-cyclohexenyl) ether of 1,3,6-hexanetriol produced above is then added to 200 parts of chloroform. 165 parts of a 45% peracetic acid solution is then added to the mixture and the resulting mixture maintained at 30° C. for 2 hours and then allowed to stand in a water bath at 27° C. for 12 hours. The reaction mixture is then extracted with water, sodium carbonate, water and then filtered and dried. Chloroform is taken off and the product distilled to yield tris(3,4-epoxycyclohexyl) ether of 1,3,6-hexanetriol.

The ether produced above is heated with 5 parts (per 100 parts of the ether) of BF$_3$-ethyl ether complex at 100° C. for several hours. The resulting product is a hard solvent resistant casting.

I claim as my invention:

1. A polyepoxide comprising an ether of (1) a monohydric alcohol having a

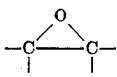

group contained in a cycloalkyl ring, and (2) an organic polyhydroxy-containing compound.

2. A polyepoxide comprising an ether of (1) a monohydric alcohol having a

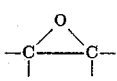

group contained in a single six membered cycloalkyl ring, and (2) a polyhydric alcohol containing no more than 12 carbon atoms.

3. A polyepoxide comprising an ether of (1) a monohydric alcohol having a

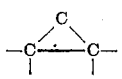

group contained in a single six membered cycloalkyl ring, and (2) a polyhydric phenol.

4. A polyepoxide comprising an ether of a vicinal-epoxycycloalkylalkanol and a dihydric alcohol containing no more than 12 carbon atoms.

5. A polyepoxide comprising an ether of a vicinal-epoxycycloalkanol and a dihydric alcohol containing no more than 12 carbon atoms.

6. A di(vicinal-epoxycyclohexylmethyl) ether of a dihydric alcohol containing up to 12 carbon atoms.

7. Di(3,4-epoxycyclohexylmethyl) ether of 1,4 - bis (hydroxymethyl) tetramethylbenzene.

8. Di(3,4 - epoxycyclohexylmethyl) ether of 1,4-butanediol.

9. Di(3,4 - epoxycyclohexylmethyl) ether of resorcinol.

10. Di(3,4 - epoxycyclohexyl) ether of 1,4 - bis(hydroxymethyl) tetramethylbenzene.

11. A cured polymer of the polyepoxide defined in claim 1.

12. A cured polymer of the polyepoxide defined in claim 2.

13. A polymer obtained by reacting the polyepoxide of claim 6 with an acid anhydride in the presence of an amine.

14. A polymer of di(3,4-epoxycyclohexylmethyl) ether of 1,4-di(hydroxymethyl) tetramethylbenzene.

15. A process for producing polyepoxides which comprises reacting an ether of a monohydric alcohol having an ethylenic group in a cycloalkyl alcohol and an organic polyhydroxy-containing compound with an approximately chemical equivalent amount of a peracid in the presence of an inert solvent.

No references cited.